United States Patent [19]

Whateley

[11] 4,236,617
[45] Dec. 2, 1980

[54] VEHICLES
[75] Inventor: Eric A. Whateley, Huddersfield, England
[73] Assignee: David Brown Gear Industries Limited, Huddersfield, England
[21] Appl. No.: 901,823
[22] Filed: May 1, 1978
[30] Foreign Application Priority Data
Nov. 11, 1977 [GB] United Kingdom ............... 46963/77
[51] Int. Cl.³ ...................... F16D 33/00; F16D 67/00; B60K 41/22
[52] U.S. Cl. ..................................... 192/3.3; 192/3.57
[58] Field of Search ....................... 192/3.3, 3.26, 3.57; 74/733

[56] References Cited
U.S. PATENT DOCUMENTS

| | | | |
|---|---|---|---|
| 2,736,412 | 2/1956 | Livezey | 192/3.3 X |
| 2,965,202 | 12/1960 | Christenson | 192/3.3 X |
| 3,262,523 | 7/1966 | Gordon | 192/3.57 X |
| 3,505,907 | 4/1970 | Fox et al. | 74/732 |
| 3,897,698 | 8/1975 | Ohsaka | 74/732 |

Primary Examiner—Allan D. Herrmann
Attorney, Agent, or Firm—Norris & Bateman

[57] ABSTRACT

A vehicle includes variable-ratio gearing driven via a hydrodynamic torque converter. The converter has a hydraulically-engaged lock-up clutch which is temporarily disengaged whenever a ratio is disengaged. The vehicle has a system of hydraulically-engaged clutches and brakes for changing ratio, and a system of hydraulically-engaged brakes for bringing the vehicle to rest. The respective operating pressures in the clutch-and-brake system and the braking system are independently modulated, in order more smoothly to change ratio or bring the vehicle to rest, by enabling a relief valve in each system to open against a determined spring force when pilot pressure exerted on each valve in the closing direction and derived from the operating cylinder of the lock-up clutch is temporarily cut off.

16 Claims, 3 Drawing Figures

VEHICLES

BACKGROUND OF THE INVENTION

The invention relates to vehicles, and more particularly to vehicles including a power transmission mechanism comprising variable-ratio gearing driven by way of a hydrodynamic torque converter having a hydraulically-engaged lock-up clutch, and also including hydraulically-engaged friction means comprising either clutch and/or brake means for establishing a ratio in the gearing or brake means for bringing the vehicle to rest, or both such means.

The object of the invention is to modulate operation of the friction means by retarding the engagement thereof so that ratio variations in the gearing occur, and/or the vehicle is brought to rest, more smoothly.

SUMMARY OF INVENTION

According to the invention, a vehicle includes a power transmission mechanism comprising variable-ratio gearing driven by way of a hydrodynamic torque converter having a hydraulically-engaged lock-up clutch which is temporarily disengaged whilst a ratio is being established in the gearing; hydraulically-engaged friction means; a pump capable of supplying oil under pressure to the friction means; and a relief valve interposed between the pump and the friction means, said relief valve being urged in the closing direction by resilient means, and also being subject to pilot pressure in said direction whilst the lock-up clutch is engaged.

BRIEF DESCRIPTION OF DRAWINGS

A preferred embodiment of the invention will now be described, by way of example, with reference to the accompanying drawings of which.

DESCRIPTION OF PREFERRED EMBODIMENT

Figure 1:
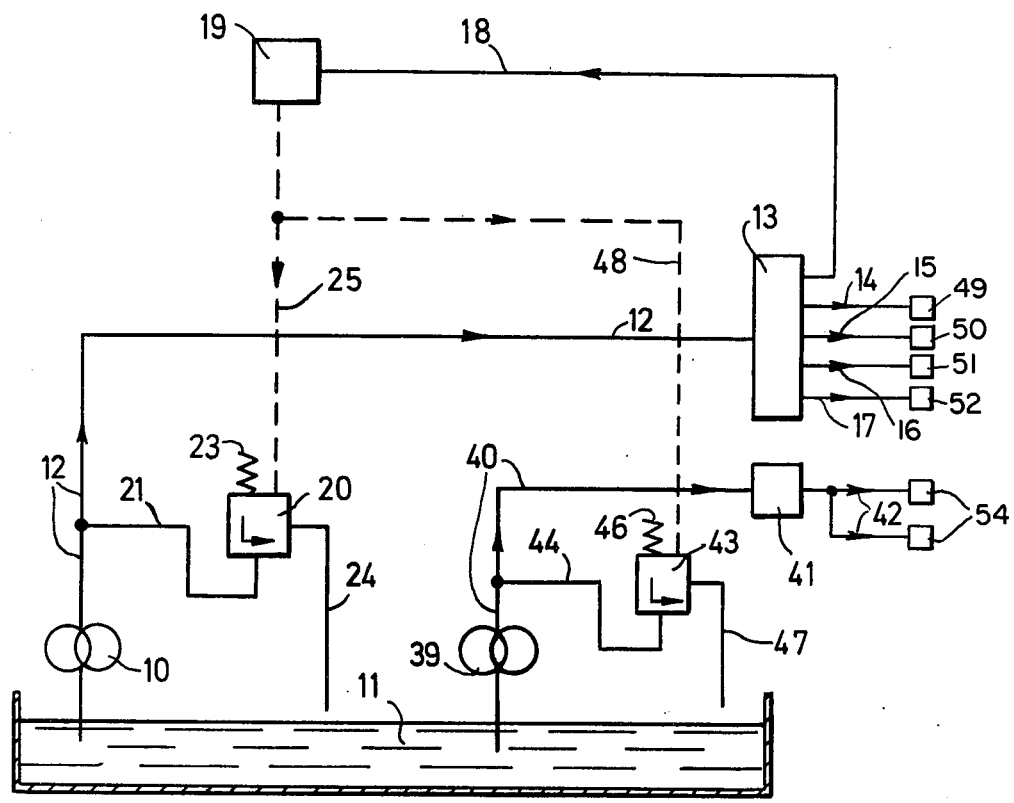
FIG. 1 is a diagrammatic view of a hydraulic system for a vehicle.
Figure 2:
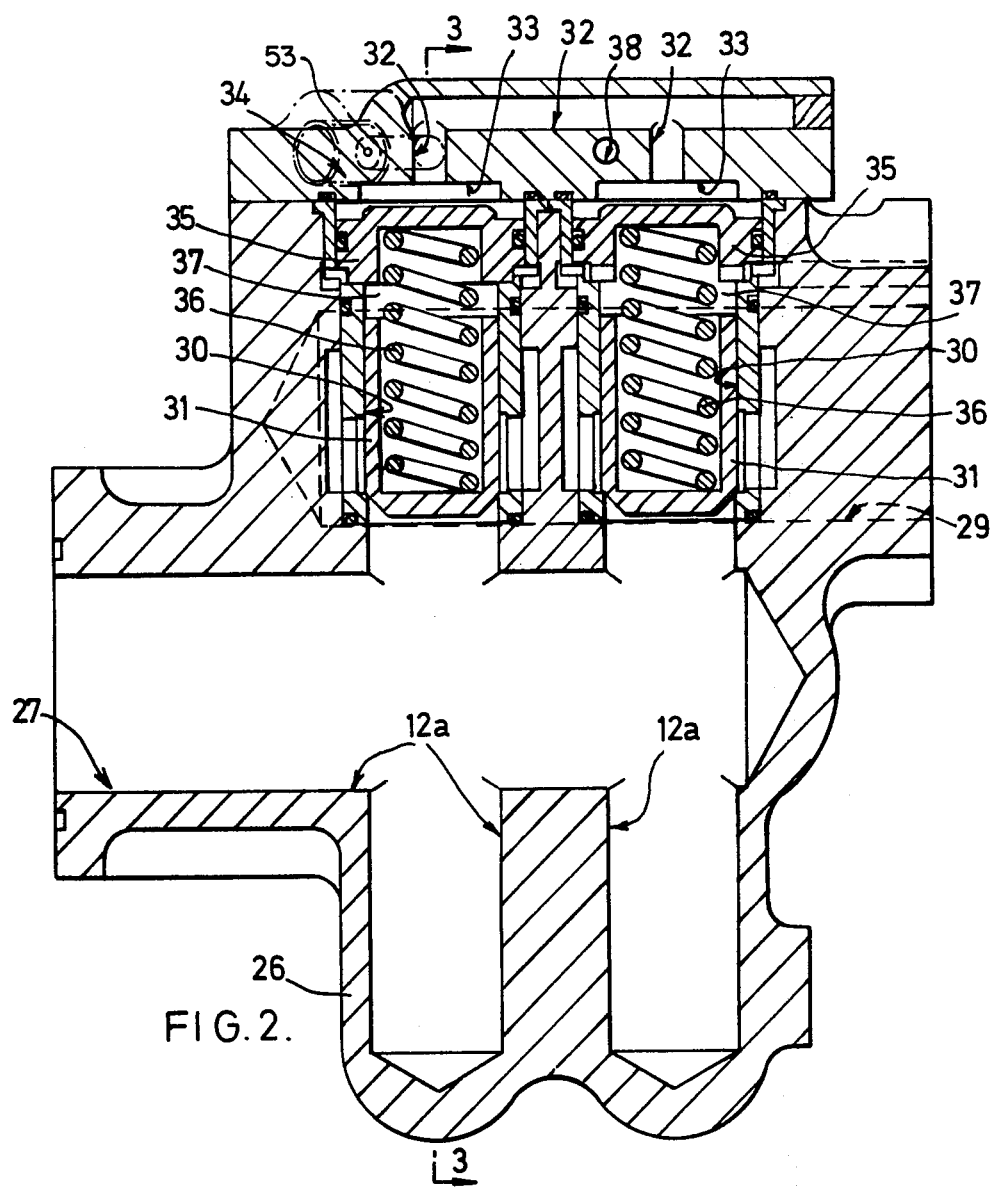
FIG. 2 is a section on the centre-line of a relief valve assembly employed in the hydraulic system.
Figure 3:
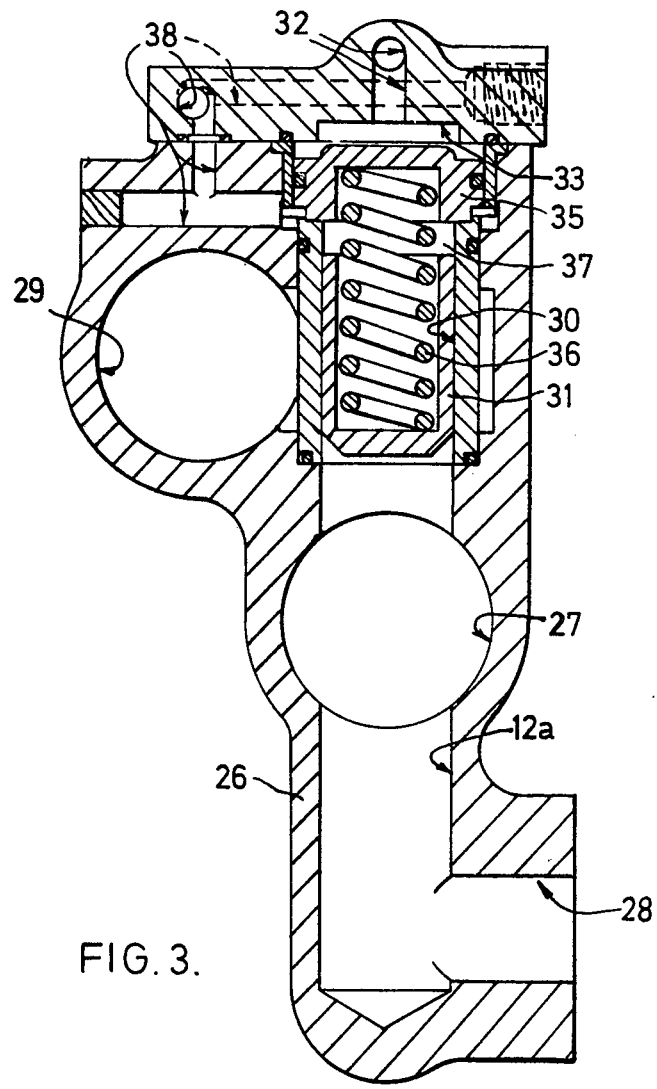
FIG. 3 is a section on the line 3—3 in FIG. 2.

Referring now to the drawings, a vehicle has an automatic power transmission mechanism including four-speed-ratio toothed transmission gearing (not shown) with a plurality of associated selectively operable hydraulically-engaged friction clutches and brakes 49, 50, 51 and 52, said gearing being driven by way of a hydrodynamic torque converter having a hydraulically-engaged lock-up clutch for driveably connecting together without slip its impeller and its turbine in known manner. A ratio-establishing circuit with modulating means comprises a first pump 10 which draws oil from a sump 11 and delivers it under pressure by way of a conduit 12, a solenoid-operated selector valve block 13 and the appropriate one or ones of conduits 14, 15, 16 and 17 to the required transmission clutch or clutches and/or brake or brakes for establishing a selected speed ratio. Operation of the selector valve block 13 is controlled automatically in accordance with the road speed of the vehicle, with overriding manual selection of the highest speed ratio permitted to be established. Oil under pressure is also supplied by way of the valve block 13 and a conduit 18 to a hydraulic operating cylinder 19 of the lock-up clutch, but the supply of oil to said clutch is temporarily interrupted by the valve block 13 for, say, 7/10 second whilst a speed ratio is in process of being established, that is to say whilst low gear is being established and the vehicle is moving off from rest, and whilst a change of speed ratio is being established when the vehicle is in motion. The supply of oil to said clutch is also cut off just before the vehicle comes to rest. The maximum delivery pressure of the pump 10 which holds the selected ones of the transmission clutches and brakes engaged is, say, 18.5 bar. However, a pressure of this magnitude would cause very rapid, harsh engagement of said clutches and brakes, and in order to retard and thus soften their engagement a first pilot controlled relief valve 20 communicates with the conduit 12 by way of a conduit 21. In principle, the relief valve 20 is urged by a spring 23 in a direction to blank off a conduit 24 leading to the sump 11, and is also subject to hydraulic pressure in said direction, whilst the lock-up clutch is engaged, by means of a pilot conduit 25 connecting relief valve 20 to the hydraulic operating cylinder 19 of said clutch. In detail, the relief valve 20 comprises a valve body 26 having a port 27 communicating with the pump 10, a pair of ports 28 which merge and communicate with the selector valve block 13, passages 12a constituting in effect a part of the conduit 12 and interconnecting the ports 27 and 28, an outlet 29 to the sump 11 connected to the passages 12a by parallel sleeved bores 30, identical valve spools 31 slideable in the respective bores 30, and passages 32 connecting a space 33 at the rear of each valve spool 31 to a port 34 connected by the pilot conduit 25 to the hydraulic operating cylinder 19 of the lock-up clutch. A piston 35 is slideable in each of the spaces 33, and a helical compression spring 36 is confined between each piston 35 and the associated valve spool 31. A restrictor 53 is provided in the port 34, its cross-sectional area being such as to retard closing of the valve spools 31 over a predetermined period of time. A space 37 between each piston 35 and the associated valve spool 31 is vented to the sump 11 by way of passages 38 to prevent pressure build-up in the event of oil seepage.

The first relief valve 20 includes two valve spools 31 in parallel merely in order to cater for high flow rates whilst utilising available components. A single larger valve spool operating in accordance with the same principle could equally well be employed.

The vehicle also has hydraulically-engaged wet multi-disc friction brakes 54 for bringing it to rest, and a brake-applying circuit with modulating means comprises a second pump 39 which draws oil from the sump 11 and, when required, delivers it to said brakes under pressure by way of a conduit 40, a brake operating valve 41 and a branched conduit 42. The maximum delivery pressure of the pump 39 which acts to apply said brakes is, say, 55 bar. However, due to the rapid increase in the coefficient of friction when the speed of the rotating components of said brakes falls to, say, 20 radians per second, that is to say just before the vehicle comes to rest, said brakes tend to "grab", that is to say to lock suddenly and slightly prematurely, and thus bring the vehicle to a sudden halt. This imposes very high loads on said brakes and is disconcerting to the driver. In order to retard locking of the brakes, means are provided for decreasing the brake-engaging pressure when the coefficient of friction increases. Said means comprise a second pilot controlled relief valve 43 which communicates with the conduit 40 by way of a conduit 44. In principle, the second relief valve 43 is identical to the first relief valve 20, being urged by a spring 46 in a direction to blank off a conduit 47 leading to the sump 11, and also being subject to hydraulic pressure in said direction, whilst the lock-up clutch is engaged, by means of a pilot conduit 48 connecting the relief valve 43 to the pilot conduit 25 and thence to the hydraulic operating cylinder 19 of said clutch. In detail, the second relief valve 43 is substantially identical to the first relief valve 20 except that only a single valve spool and its associated components are provided due to the lower flow rates required to operate the vehicle's brakes (although two valve spools in parallel could equally well be employed in the relief valve 43 in cases where high flow rates were required for this purpose), and that no restrictor is necessary in the port connecting the relief valve 43 to the pilot conduit 48.

In operation, when the process of establishing a speed ratio commences, the supply of oil under pressure to the hydraulic operating cylinder 19 of the lock-up clutch and thus to the spaces 33 in the body 26 of the first relief valve 20 which contain the pistons 35 is temporarily cut off. The pistons 35 therefore move to that end of the spaces 33 remote from the valve spools 31 so as to reduce the effective rates of the springs 36, thereby permitting the valve spools 31 to open against the action of said springs. The delivery pressure of the first pump 10 acting to engage the selected one of the transmission clutches and brakes is accordingly reduced to, say, 10 bar in order to retard and thus soften their engagement. Said engagement is of course additionally cushioned by the torque converter which is temporarily unlocked. This engagement procedure is substantially completed within the time that the lock-up clutch is disengaged, and upon re-engagement of said clutch the pilot pressure acting on the pistons 35 is progressively restored at a rate governed by the restrictor whereby the valve spools 31 close at a controlled rate and the delivery pressure of the pump 10 returns progressively to its maximum value.

When the vehicle's brakes are applied by the driver actuating the brake operating valve 41, the gearing automatically changes down until low gear is reached. During each down-change, the supply of oil to the hydraulic operating cylinder 19 of the lock-up clutch and thus to the second relief valve 43 is temporarily cut off, as a result of which said valve opens momentarily and the brake-engaging pressure is transiently reduced without any significant effect on the performance of the vehicle's brakes. Just before the vehicle comes to rest, as the speed of the rotating components of its brakes falls close to, say, 20 radians per second, the supply of oil to the hydraulic operating cylinder 19 of the lock-up clutch and thus to the relief valve 43 is again cut off, and remains cut off until such time as the vehicle has begun to move off again. The relief valve 43 therefore opens and remains open so that the delivery pressure of the second pump 39 acting to apply the vehicle's brakes is accordingly reduced to, say, 28 bar in order to retard locking thereof and thus to prevent a significant terminal increase in deceleration.

The modulating means can be omitted from either the ratio-establishing circuit or the brake-applying circuit if so desired, as each circuit operates independently of the other. The restrictor in the relief valve 20 is not an essential feature of the invention, and if found unnecessary it can be omitted.

I claim:

1. In a vehicle including a power transmission mechanism comprising variable-ratio gearing driven by way of a hydrodynamic torque converter having a hydraulically-engaged lock-up clutch which is temporarily disengaged while a ratio is being established in said gearing; friction clutch and/or brake means for establishing a ratio in said gearing; friction brake means for bringing the vehicle to rest; at least one of said ratio-establishing friction clutch and/or brake means and said friction brake means bringing the vehicle to rest being hydraulically engaged and forming part of a hydraulic circuit comprising a pump capable of supplying oil under pressure in the circuit and a relief valve interposed between the pump and that one of said ratio-establishing friction clutch and/or brake means and said friction brake means for bringing the vehicle to rest forming part of said circuit, said relief valve being urged in the closing direction by resilient means, and said relief valve also being interconnected with said lock-up clutch so as to be subject to pilot pressure in said closing direction while said lock-up clutch is engaged.

2. In a vehicle according to claim 1, the relief valve comprising a port communicating with the pump, a port communicating with the friction means, a passage interconnecting said ports, an outlet connecting said passage to sump, a valve spool urged by a spring in a direction to close the outlet, and a conduit connecting a space at the rear of the spool to a hydraulic operating cylinder of the lock-up clutch.

3. In a vehicle according to claim 2, the conduit containing a restrictor to retard closing of the valve when the lock-up clutch is re-engaged.

4. In a vehicle according to claim 2, the pilot pressure acting on a piston against which the spring reacts.

5. In a vehicle according to claim 4, therein being a space between the valve spool and the piston vented to a sump.

6. In a vehicle according to claim 2, the relief valve comprising two identical valve spools in parallel.

7. In a vehicle including a power transmission mechanism comprising variable-ratio gearing driven by way of a hydrodynamic torque converter having a hydraulically-engaged lock-up clutch which is temporarily disengaged while a ratio is being established in said gearing; hydraulically-engaged friction clutch and/or brake means for establishing a ratio in the gearing; a pump connected in a hydraulic circuit with said clutch and/or brake means; and a relief valve in said circuit interposed between said pump and said clutch and/or brake means, said relief valve being urged in the closing direction by resilient means, and said relief valve also being interconnected with said lock-up clutch so as to be subject to pilot pressure in said closing direction while said lock-up clutch is engaged.

8. In a vehicle according to claim 7, a plurality of clutch and/or brake means being provided, the pump being capable of supplying oil under pressure thereto by way of selector valve means, and the relief valve being interposed between the pump and the selector valve means.

9. In a vehicle according to claim 8, the lock-up clutch being supplied with oil under pressure by the selector valve means.

10. In a vehicle including a power transmission mechanism comprising variable-ratio gearing driven by way of a hydrodynamic torque converter having a hydraulically-engaged lock-up clutch which is temporarily disengaged whilst a ratio is being established in the gearing; hydraulically-engaged friction brake means for bringing the vehicle to rest; a pump connected in a hyraulic circuit with said brake means; and a relief valve in said circuit interposed between said pump and said brake means, said relief valve being urged in the closing direction by resilient means, and said relief valve also being interconnected with said lock-up clutch so as to be subjected to pilot pressure in said closing direction while said lock-up clutch is engaged.

11. In a vehicle including a power transmission mechanism comprising variable-ratio gearing driven by way of a hydrodynamic torque converter having a hydraulically-engaged lock-up clutch which is temporarily disengaged while a ratio is being established in the gearing; hydraulically-engaged friction clutch and/or brake means for establishing a ratio in the gearing; a first pump connected in a first hydraulic circuit with said clutch and/or brake means; a first relief valve in said first circuit interposed between the first pump and said clutch and/or brake means; hydraulically-engaged friction brake means for bringing the vehicle to rest; a second pump connected in a second hydraulic circuit with the brake means for bringing the vehicle to rest; and a second relief valve in said second circuit interposed between the second pump and the brake means for bringing the vehicle to rest; each of said relief valves being urged in the closing direction by resilient means, and also being interconnected with the lock-up clutch so as to be subject to pilot pressure in said direction whilst the lock-up clutch is engaged.

12. In a vehicle according to claim 11, wherein each relief valve comprises a port communicating with the associated pump and the associated friction means, a bore communicating with said port, an outlet connecting said bore to sump, a valve spool in said bore urged by a spring in a direction to close said port, and a conduit connecting a space at the rear of the spool to a hydraulic operating cylinder of the lock-up clutch.

13. In a vehicle according to claim 12, the conduit associated with the first relief valve containing a restrictor to retard closing of the valve when the lock-up clutch is re-engaged.

14. In a vehicle according to claim 12, the pilot pressure acting on a piston against which the spring reacts.

15. In a vehicle according to claim 14, there being a space between the valve spool and the piston vented to sump.

16. In a vehicle according to claim 12, at least one of the relief valves comprising two identical valve spools in parallel.

* * * * *